US012703142B2

(12) United States Patent
Lochmann et al.

(10) Patent No.: US 12,703,142 B2
(45) Date of Patent: Aug. 11, 2026

(54) POLYGLYCEROL FATTY ACID ESTER-CONTAINING COMPOSITION

(71) Applicant: IOI OLEO GMBH, Hamburg (DE)

(72) Inventors: Dirk Lochmann, Frondenberg (DE); Sebastian Reyer, Essen (DE); Sharareh Salar Behzadi, Vienna (AT); Michael Stehr, Gelsenkirchen (DE)

(73) Assignee: IOI OLEO GMBH, Deutschland (DE)

( * ) Notice: Subject to any disclaimer, the term of this patent is extended or adjusted under 35 U.S.C. 154(b) by 136 days.

(21) Appl. No.: 18/273,563

(22) PCT Filed: Jan. 29, 2021

(86) PCT No.: PCT/DE2021/000014
§ 371 (c)(1),
(2) Date: Jul. 21, 2023

(87) PCT Pub. No.: WO2022/161558
PCT Pub. Date: Aug. 4, 2022

(65) Prior Publication Data
US 2024/0083107 A1 Mar. 14, 2024

(51) Int. Cl.
*B29C 64/153* (2017.01)
*B29C 48/05* (2019.01)
(Continued)

(52) U.S. Cl.
CPC ............ *B29C 64/153* (2017.08); *B29C 48/05* (2019.02); *B29C 48/28* (2019.02); *B29C 64/209* (2017.08);
(Continued)

(58) Field of Classification Search
CPC ....... B29C 70/205; B29C 64/10; B29C 64/00; B29C 44/1276; B29C 70/24;
(Continued)

(56) References Cited

U.S. PATENT DOCUMENTS 6,660,278 B1 12/2003 Larsson et al.
2018/0334642 A1 11/2018 Hodgdon et al.

FOREIGN PATENT DOCUMENTS

CA 2306913 A1 * 4/1999 ............. A23L 33/26
EP 3482774 A1 5/2019
(Continued)

OTHER PUBLICATIONS

International Search Report mailed Oct. 25, 2021 in corresponding PCT Application No. PCT/DE2021/000014.
(Continued)

*Primary Examiner* — Stella K Yi
(74) *Attorney, Agent, or Firm* — Miles & Stockbridge P.C.; Ajay A. Jagtiani

(57) ABSTRACT

The invention relates to a polyglycerol fatty acid ester-containing composition which has the following three components, namely: first, polyglycerol fatty acid esters that can be obtained by esterifying polyglycerols, which have 2 to IO glycerol units, with fatty acids with 12 to 22 carbon atoms; second, free poly glycerols, which have 2 to IO glycerol units; and third, polyglycerol fatty acid monoesters, which have 2 to IO glycerol units and fatty acid groups with 12 to 22 carbon atoms. The composition is suitable in particular for use in starting materials for a 3D printing method and can be readily combined with cosmetic and/or pharmaceutical active ingredients or other substances. The invention also relates to methods for producing corresponding starting materials for a likewise described 3D printing method and to molded bodies which can be produced using same.

7 Claims, 1 Drawing Sheet

Figures 1A, 1B, 2A, 2B:
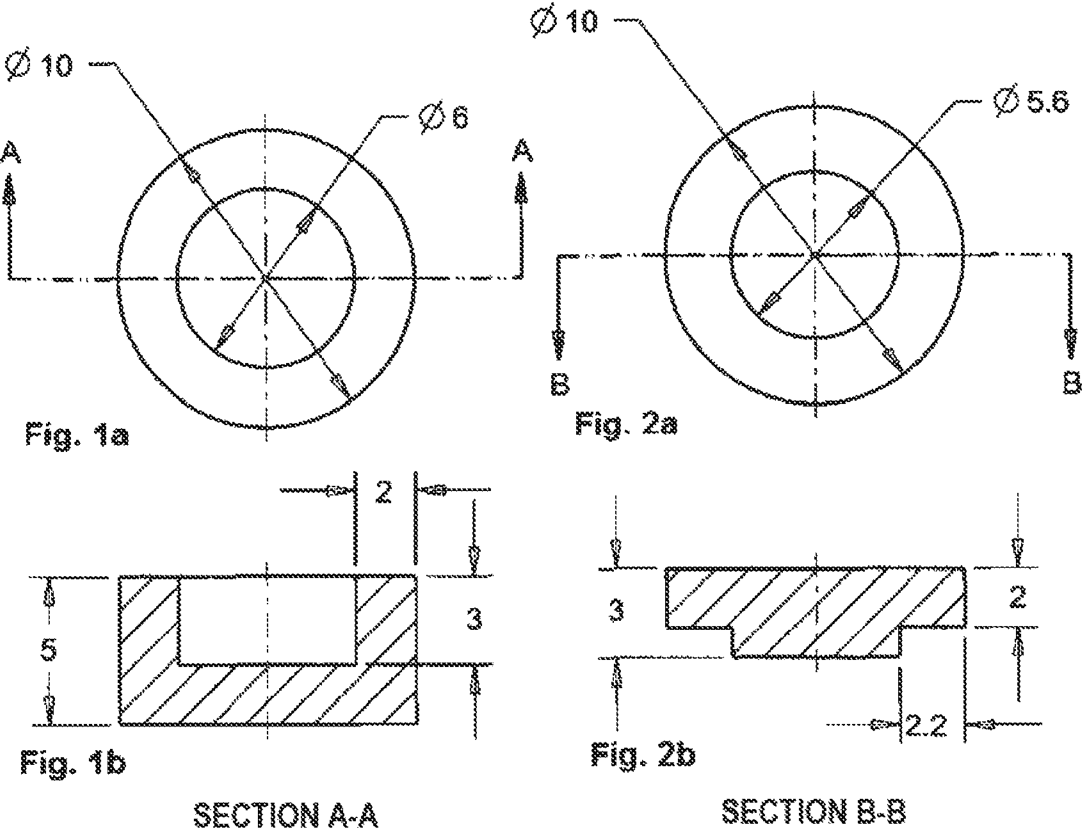

(51) Int. Cl.
*B29C 48/28* (2019.01)
*B29C 64/209* (2017.01)
*C11C 3/00* (2006.01)

(52) U.S. Cl.
CPC ........ *C11C 3/003* (2013.01); *B29C 2791/001* (2013.01); *B29C 2791/002* (2013.01); *B29C 2948/92704* (2019.02); *B29C 2948/92904* (2019.02)

(58) Field of Classification Search
CPC ..... B29C 70/222; B29C 70/085; B29C 64/40; B29C 64/171; B29C 48/05; B29C 48/28; B29C 64/209; B29C 64/153
See application file for complete search history.

(56) References Cited

FOREIGN PATENT DOCUMENTS

| | | | |
|---|---|---|---|
| GB | 1458568 | A | 12/1976 |
| WO | 9920111 | A1 | 4/1999 |
| WO | 2020083411 | A1 | 4/2020 |

OTHER PUBLICATIONS

Written Opinion mailed Oct. 25, 2021 in corresponding PCT Application No. PCT/DE2021/000014.

* cited by examiner

Ø 10
Ø 6
A
A

Ø 10
Ø 5.6
B
B 2
3
5

SECTION A-A
3
2
2.2

SECTION B-B

POLYGLYCEROL FATTY ACID ESTER-CONTAINING COMPOSITION

CROSS-REFERENCE TO RELATION APPLICATIONS

This application is a National Stage of International Application No. PCT/DE2021/000014, filed on Jan. 29, 2021, which is hereby incorporated by reference in its entirety.

Many polyglycerol fatty acid esters have good properties for acting as substrates for pharmaceuticals or cosmetics or even in areas of application such as the foodstuffs industry, or in general in all areas in which stability upon storage is required. In particular, in contrast to many other lipid-based materials such triacylglycerols, some polyglycerol fatty acid esters do not exhibit any practical polymorphism and therefore do not undergo any volume changes upon long-term storage, in particular any increases in volume known as “blooming”.

WO 2020/083411 A1 already discloses suitable polyglycerol fatty acid esters or blends thereof for a hot melt coating process. Hot melt coating offers advantages over other coating or sheathing processes because the coating material can be used without solvents, and in this manner, undesirable, possibly toxic solvent residues do not have to be removed from the product using complicated drying steps. The use of polyglycerol fatty acid esters in respect of the preparation of products which are to be introduced into the human or animal body also has the advantage that at least the esterification of polyglycerols with even-numbered fatty acids produces polyglycerol fatty acid esters for which toxic decomposition products can be excluded as far as possible in vitro and in vivo.

In addition to the use of substrates such as the aforementioned polyglycerol fatty acid esters in the hot melt coating process, there is also a need to use materials with comparable properties in the field of 3D printing. In this regard, though, simply directly using materials employed for hot melt coating would not be successful, because for 3D printing processes, starting materials are required which have to be sufficiently softened or fluidified by heating for them to be able to be forced through a print head nozzle so that after building a predefined shaped article, it can harden properly to form a body which has a stable shape. In particular, although polyglycerol fatty acid esters such as those described in WO 2020/008411 A1 can in fact be forced through a 3D print nozzle, the stability of the shape of the shaped article produced thereby by 3D printing is not sufficient to be able to guarantee that stability during industrial packaging steps and during handling of the products as well. Furthermore, the problem arises that at least when admixing very bulky pharmaceutically or cosmetically active substances with the respective substrate, the physical properties of the starting material for 3D printing could be changed in a manner such that the products are neither stable in shape nor stable upon storage, or cannot be printed into products with a uniform quality because of increased brittleness.

EP 3 482 774 B1 discloses a system which can be produced by means of 3D printing which is self-emulsifying in contact with a physiological hydrophilic phase in vivo and has a lipophilic phase, a surfactant with an HLB value of more than 8 and an optional co-surfactant, wherein the surfactant consists of PEG esters, poloxamers, ethoxylated oils, ethoxylated vitamin E and/or sugar residues produced from fatty acids. The disadvantage with that composition is that toxic degradation products cannot be definitively excluded and the stabilities in respect of shape and upon storage could well be improved upon. In addition, the problem arises that according to the cited examples, the admixture of pharmaceutical active substances can only amount to just under 7% by weight of the starting material for the 3D printing, so that because of the disadvantageous propensity of each individual pharmaceutical active substance for demixing and phase separation even when the starting material has not been admixed, then a fresh investigation of the processability of the admixture-containing starting mixture has to be carried out for every type of admixture. Compositions such as 50% to 95% by weight, preferably 85% glycerol monostearate with 5% to 50%, preferably 15% by weight polyethylene glycol 300-6000, preferably PEG 1500, can in fact still be processed in the 3D printing process despite their adhesive properties, but they are not entirely stable upon storage. Fresh PEGs may contain ethylene oxide and dioxane. Formaldehyde may be formed as they age. In addition, they are potential allergens.

The objective of the invention described below is to provide a composition which has the advantages of polyglycerol fatty acid esters as already known for hot melt coating processes, in particular the absence of polymorphism, as well as enabling this composition to be processed by means of 3D printing, which can also be carried out independently of the quantity of additional pharmaceutical and cosmetic active substances or other additives specifically employed for the proportions of admixtures or fillers that are usually employed in practice, and which provides products which are stable in shape and stable upon storage.

This objective is achieved by means of a composition, a process for its production, a 3D printing process, a process for t he preparation of starting material for the 3D printing process, as well as a shaped part produced by 3D printing, wherein advantageous embodiments are defined herein.

So that polyglycerol fatty acid ester-containing compositions can be used in a 3D printing process, they must generate both a starting material as well as an end product which is neither too soft nor too brittle. In the case of compositions which contain polyglycerol fatty acid esters, this is not a triviality. When using polyglycerol fatty acid esters, the elasticity of the starting material which, as is usual in practice, is formed into filaments for 3D printing processes, is dependent on the number of free hydroxyl groups in the composition. Up to a point, the number of free hydroxyl groups can be influenced by the degree of esterification of the polyglycerol fatty acid partial esters used, but surprisingly, the admixture of polyglycerol fatty acid monoesters and free polyglycerols is more targeted and effective. While strong bonding such as ionic bonding or covalent bonding leads to harder and more brittle compositions, an increased proportion of hydrogen bonding via the free hydroxyl groups produces a lower bonding strength and therefore a higher elasticity, because the re-orientation of individual molecules is facilitated by the greater degree of freedom. Moreover, with an increasing number of glyceryl units in the polyglycerol fatty acid monoester and the free polyglycerols, because of steric effects and the more flexible reorientation with internal shearing of the composition, it is not so easy to break bonds between smaller molecules, but the elasticity of the composition is increased because of the longer chains of molecules. Surprisingly, good properties as regards processability in 3D printing processes and stability as regards shape and upon storage of the printed products with an absence of volume changes which are contingent upon polymorphism are obtained in compositions of the type that contain at least three components, namely firstly, both polyglycerol fatty acid esters which can be obtained by the esterification of polyglycerols containing 2 to 10 glyceryl units with fatty acids containing 12 to 22 carbon atoms, as well as secondly, free polyglycerol containing 2 to 10 glyceryl units and thirdly, additional polyglycerol fatty acid monoesters containing 2 to 10 glyceryl units and containing fatty acid residues containing 12 to 22 carbon atoms.

The advantageous properties as regards the processability of the proposed compositions may be improved still further in that, in addition to the aforementioned third component, only polyglycerol fatty acid esters which can be obtained from the esterification of polyglycerols containing 2 to 6 glyceryl units are used as component 1, and polyglycerols which only contain 3 to 6 glyceryl units are used as component 2. It has also been shown to be advantageous for component 1 not to be present as a full ester, but as a partial ester with a hydroxyl value of 50 mg KOH/g to 350 mg KOH/g. Preferably, the saponification number of the first component is 100 mg KOH/g to 250 mg KOH/g. A melting point for component 1 which is 35° C. or more and a maximum of 80° C. has also been shown to be advantageous, because low melting points authorise a lower processing temperature which, in the case of thermolabile active substances with which the proposed compositions are processed together, means that innocuous low temperatures can be employed in the process.

As can be concluded from the discussions above, the hydroxyl value of the second component of the composition is also relevant to the elasticity of the composition as a whole. Preferably, it is 800 mg KOH/g to 1400 mg KOH/g, while the third component, i.e. the polyglycerol fatty acid monoester, should preferably have a hydroxyl value of 400 mg KOH/g to 650 mg KOH/g.

The mixing ratio for the three components relative to one another also influences the properties of the composition. Good results are obtained when the percentage by weight of the first component is at least 50%, that of the second component is at least 5% and that of the third component is at least 10%, wherein the sum of the percentages by weight of the three components is preferably at least 98%.

A well-balanced composition which, together with other solids as additives, also has a sufficient consistency to provide desirable properties in a starting material in a 3D printing process, contains polyglycerol fatty acid esters which can be obtained from the partial esterification of a hexaglycerol with palmitic acid as component 1 and a component 3 which contains a fatty acid residue containing 16 carbon atoms.

The proposed compositions can be produced in a simple manner by melting and mixing component 1, component 2 and component 3, for example at 80° C., wherein the melting temperature of the individual components is advantageously not exceeded or only slightly exceeded. Next, the mixture is allowed to solidify at a temperature of 15° C. to 25° C., i.e. at approximately room temperature, and at a pressure of 750 hPa to 1250 hPa. Usually, it is sufficient to leave the mixture to solidify by itself. The homogeneity of the mixture can occasionally be additionally assisted by moderate stirring of the melt.

If the composition is to be used in a 3D printing process, then it has been shown to be advantageous to initially comminute the solidified mixture so that it can then be sieved through a sieve with a pore size of 800 μm or less and the sieved material can be picked up. The sieved material can be fed, using an appropriate system with a melting chamber and pump for highly viscous fluids, to a 3D print head nozzle and then used in a 3D printing process. Before being used in a 3D printing process, the starting material should be tested as regards its breaking strength. To this end, while it can still flow during production, a portion of the starting material is cast into plates with a length of 155 mm, a width of 45 mm and a thickness of 15 mm which, following hardening, are individually placed onto two metal cubes each with 30 mm sides which are separated from each other by 60 mm with their sides parallel, bridging over the metal cubes longitudinally. For the measurement, a punch tool, which is also produced from a metal, has a rounded punch edge which is 69 mm in length and is orientated at right angles to the space between the metal cubes, is used to increase a force acting centrally on the plate between the metal cubes until the plate breaks. To break a plate of this type under the described conditions, no more than 90 N should have to be applied.

When processing by means of 3D printing, filaments are simpler to use as a starting material because they only need to be forced through the print head nozzle using an electric motor. Feeding a filament wound on a spool by means of a double worm gear unit has been shown to be advantageous here. In order to transform the sieved material which is already suitable as a starting material for a 3D printing process into a filament which is easier to process, it is preferably extruded through an extruder nozzle head at a temperature of at least 1° C. below the melting temperature of the first component of the polyglycerol fatty acid ester-containing composition. In principle, the thickness of the filaments is determined by the shape of the print head nozzle. The diameter of the print head nozzle can be selected as a function of the specifications for the shape of the shaped parts to be printed. Larger nozzles have the advantage that the material throughput can be higher, and therefore production can be speeded up. The more delicate the shaped parts to be printed, then the smaller should be the cross section that is selected in order to provide the print with sufficient precision. Filaments with a consistently uniform cross sectional diameter of 1.52 mm to 1.96 mm have been shown to be advantageous in processing, wherein discrepancies in the cross section of a filament of up to an ovality of 0.06 can be tolerated. The ovality (O) of a cross section of a respective filament under consideration is defined here as twice the difference between its maximum diameter ($D_{max}$) and its minimum diameter ($D_{min}$) divided by their sum, i.e. $O=2\times(D_{max}-D_{min})/(D_{max}+D_{min})$. Preferably, the prepared filaments are wound onto spools with a smallest external diameter of 0.23 mm, but which may also be higher. Winding onto small-diameter spools without breakage can be considered to be an indication of a sufficient elasticity for processing in a 3D printing process. Because of the polyglycerol fatty acid ester-containing composition, production of the filaments may be carried out with a throughput of the extruded material at the extruder nozzle head of up to 7 kg/h, as long as the sieved powder has been transformed into a soft mass because of the temperatures employed.

In principle, there are two possibilities for incorporating active substances or other substances into the products of a 3D printing process. Either the substances have already been incorporated into the starting material for the 3D print and then are printed by means of the 3D printing process to form pre-defined shaped parts, or the starting material remains free from active substances or other substances, which are then introduced into cavities or chambers of the at least partially prepared shaped article. The incorporation of micronized solids into the polyglycerol fatty acid ester-containing composition to form a starting material for a 3D printing process is preferably carried out by admixing one or more micronized solids into the melted components of the polyglycerol fatty acid ester-containing composition, wherein their percentage by weight in the mixture as a whole should not exceed 10%, so that the processability of the starting material which is obtained in this manner is maintained. In this regard, the type of substance which is admixed as the micronized solid is practically immaterial. Preferably, the micronized solids are from the pharmaceutical or cosmetic active substance group.

In the case of the second possibility for incorporating active substances or other substances into the products of a 3D printing process, the polyglycerol fatty acid ester-containing composition per se, preferably as a filament, can be printed to form shaped articles with one or more cavities and/or chambers. A simple way to achieve this, for example, is to 3D print a shaped article in the form of a cup, into the cavity of which active substances or other substances, which may be solid, semi-solid or liquid, can be introduced as filling materials. The opening of the shaped article can subsequently be closed by means of a second shaped part, for example in the form of a lid, which is suitable for fitting to it in an interlocking and/or a friction-fitting manner, which is preferably printed from the same starting material. A more elegant solution here would be to incorporate filling material into a shaped article where printing of a shaped article is initially carried out up to a point at which a cavity which is sufficient for filling has been formed, then to introduce the filling material and then to complete the 3D printing, wherein preferably, filled cavities can be closed to form chambers provided with filling material. All of the advantages of a 3D printing process can be exploited in this manner. Thus, it is possible to introduce different substances, such as two or more different pharmaceutical active substances, into separate chambers of the same shaped article. The release of the active substances can be controlled by means of different wall thicknesses.

Because of the polyglycerol fatty acid ester-containing composition which is proposed here, 3D printing processes are therefore possible which permit both the incorporation of active substances or other substances into the starting material for a 3D printing process and also permit an incorporation of solid, semi-solid or liquid filling materials into appropriately shaped articles. In addition, both variations may be combined together, so that solids admixed with the starting material can be released directly from the material of the printed shaped article and filling material which is located in chambers or cavities can only escape from cavities or chambers after disintegration of the walls bordering them or through preferably narrow shaped channels.

The printing procedure is preferably set in motion in the applied 3D printing process by forcing a polyglycerol fatty acid ester-containing composition in the form of powder, or as a filament and which is provided with an admixture or which is free from an admixture, through a print head nozzle with an inlet and an outlet. The layered build of a predefined three-dimensional shaped article is then carried out by means of the corresponding predefined movement of the outlet from the print head nozzle in various planes. Preferably in this regard, a temperature-controllable print head nozzle is used, the temperature of which during the printing procedure is 1° C. to 4.9° C. higher than the melting temperature of the starting material.

The filling material may be introduced in various ways. Closing off the opening of a filled cavity with a second shaped part or introducing the filling material into suitable cavities already formed in a part of the shaped article prior to finishing the shaped article as a whole and which are then printed into chambers or more developed cavities during finishing of the shaped article have already been described above. A third possibility is to fill a cavity or a chamber of a ready-formed shaped article with filling material by means of a cannula, preferably before it has hardened completely. Clearly, the aforementioned possibilities for filling can be combined in any way.

If the filling materials are those which contain one or more pharmaceutical active substances, then these are preferably glucocorticoids, mineralocorticoids, androgens, oestrogens, gestagens, azole antimycotics, ACE inhibitors or AT1 antagonists. Pharmaceutical active substances from this group are also suitable as an admixture for the polyglycerol fatty acid ester-containing composition.

The invention will now be described in more detail and in a non-limiting manner with the aid of the drawings and two examples.

Example 1

80.5% by weight of hexaglyceryl palmitic acid partial ester with an average hydroxyl value of 160 was used as component 1. 8.0% by weight of hexaglycerol was used as component 2 and 11.5% by weight of hexaglyceryl monopalmitate was used as component 3. The components were mixed together and melted. The melt was homogenised by stirring and allowed to stand and solidify at a room temperature of 20° C. and a pressure of 1005 hPa. A portion of the melt was placed in five identical moulds and in this manner were moulded into 155 mm×45 mm×15 mm plates which, after hardening, underwent a bending fatigue test as described above. The mean force required to break a plate was 83 N. The solidified mass was comminuted and passed through a sieve with a pore size of 800 μm. The sieved material was extruded at a temperature of 49° C. to form filament strands with a uniform continuous cross section of 1.75 mm with a maximum ovality of 0.02. The filaments were wound onto spools with a smallest diameter of 23 mm. A spool of filament was inserted into a 3D printer and 3D printing was started at a print nozzle temperature of 50.5° C. The printed shaped part was in the form of a handleless cup (FIGS. 1a, 1b, dimensions in mm). Filling material which consisted of 10 mg of micronized prednisolone was introduced into the cup-shaped shaped part. At the same time as the cup-shaped shaped part was formed (FIGS. 1a, 1b, dimensions in mm), a lid-shaped shaped part (FIGS. 2a, 2b, dimensions in mm) which fitted the opening of the cup-shaped shaped part (FIGS. 1a, 1b, dimensions in mm) was printed from the same starting material. By means of the lid-shaped shaped part (FIGS. 2a, 2b, dimensions in mm), the opening of the cup-shaped shaped part (FIGS. 1a, 1b, dimensions in mm) was closed to form the finished prednisolone-containing product.

Example 2

67.7% by weight of hexaglyceryl palmitic acid partial ester with an average hydroxyl value of 160 was used as component 1. 13.6% by weight of hexaglycerol was used as component 2 and 9.6% by weight of hexaglyceryl monopalmitate was used as component 3. 9.1% by weight of micronized dexamethasone was added. The components were mixed together and melted. The melt was homogenised by stirring and allowed to stand to solidify it at a room temperature of 20° C. and a pressure of 1005 hPa. The solidified mass was comminuted and passed through a sieve with a pore size of 800 μm. The sieved material was extruded at a temperature of 49° C. to form filament strands with a uniform continuous cross section of 1.75 mm with a maximum ovality of 0.02. The filaments were wound onto spools with a smallest diameter of 23 mm. A spool of filament was inserted into a 3D printer and 3D printing was started at a print nozzle temperature of 50.5° C. The printed shaped part was in the form of a flat cylinder and provided the finished dexamethasone-containing product in the form of a tablet.

The invention claimed is:

1. A process for producing starting material for a 3D printing process, characterized by the following steps:

i) melting and mixing together component 1, namely polyglycerol fatty acid esters which can be obtained form an esterification of polyglycerols containing 2 up to 10 glyceryl units with fatty acids containing 12 up to 22 carbon atoms, component 2, namely free polyglycerol containing 2 to 10 glyceryl units, and component 3, namely polyglycerol fatty acid monoesters containing 2 to 10 glyceryl units and containing fatty acid residues containing 12 to 22 carbon atoms;

ii) solidifying the mixture according to step i) at a temperature of 15° C. to 25° C. and a pressure of 750 hPa to 1250 hPa;

iii) comminuting the solidified mixture according to step ii);

iv) sieving the comminuted mixture according to step iii) through a sieve with a pore size of 800 μm or less and picking up the sieved powder.

2. The process as claimed in claim 1, characterized by the following additional step:

v) extruding the starting material produced as claimed in claim 1 through an extruder nozzle head to form a filament at a temperature which is at least 1° C. below the melting temperature of component 1 of the polyglycerol fatty acid ester-containing composition of the starting material as claimed in claim 1.

3. The process as claimed in claim 2, characterized by the following additional step:

vi) selecting filaments with a continuous uniform cross sectional diameter which is in the range 1.52 mm to 1.96 mm, with discrepancies in the cross section of the respective filament under consideration of up to an ovality of 0.06.

4. The process as claimed in claim 2, characterized by the following additional step:

vii) winding the filament leaving the extruder nozzle head onto spools with a smallest external diameter of 23 mm or more.

5. The process as claimed in claim 2, characterized in that in step v), the sieved powder which has been transformed into a soft mass because of the temperature conditions is fed to the extruder nozzle head at a throughput of up to 7 kg/h.

6. The process as claimed in claim 1, characterized in that in step ii), one or more micronized solids which together do not make up more than 10% by weight of the total mixture are admixed with the molten components.

7. The process as claimed in claim 6, characterized in that the solids are associated with the group formed by pharmaceutical or cosmetic active substances.

* * * * *